(12) United States Patent
Nathan et al.

(10) Patent No.: US 11,064,841 B2
(45) Date of Patent: Jul. 20, 2021

(54) COOKWARE STORAGE SYSTEM

(71) Applicant: Caraway Home, Inc., New York, NY (US)

(72) Inventors: Jordan Nathan, New York, NY (US); Benjamin Gross, San Francisco, CA (US); Kenneth Young, San Francisco, CA (US); Bret Recor, San Francisco, CA (US)

(73) Assignee: Caraway Home, Inc., New York, NY (US)

( * ) Notice: Subject to any disclaimer, the term of this patent is extended or adjusted under 35 U.S.C. 154(b) by 0 days.

(21) Appl. No.: 17/063,886

(22) Filed: Oct. 6, 2020

(65) Prior Publication Data

US 2021/0100403 A1   Apr. 8, 2021

Related U.S. Application Data

(60) Provisional application No. 62/911,929, filed on Oct. 7, 2019.

(51) Int. Cl.
*A47J 47/16* (2006.01)
*A47B 81/04* (2006.01)

(52) U.S. Cl.
CPC ............. *A47J 47/16* (2013.01); *A47B 81/04* (2013.01)

(58) Field of Classification Search
CPC ...... A47J 47/16; A47B 81/04; A47B 47/0091; A47B 81/047; A47B 65/00; A47B 65/10; A47B 65/15; A47B 65/20; A47L 19/04
See application file for complete search history.

(56) References Cited

U.S. PATENT DOCUMENTS

| | | | | | |
|---|---|---|---|---|---|
| 1,750,575 | A | * | 3/1930 | Cubberley | ............. A47B 65/15 211/11 |
| 1,750,576 | A | * | 3/1930 | Cubberley | ............. A47F 7/144 211/11 |
| 3,870,156 | A | * | 3/1975 | O'Neill | ................ A47B 73/006 211/74 |
| D279,245 | S | * | 6/1985 | Wohlman | ....................... D19/90 |
| 4,936,470 | A | * | 6/1990 | Prindle | .................. A47B 63/00 211/104 |

(Continued)

FOREIGN PATENT DOCUMENTS

| | | | |
|---|---|---|---|
| EP | 0370125 A | 5/1990 | |
| FR | 2933029 A1 * | 1/2010 | ............. A47B 65/20 |

(Continued)

OTHER PUBLICATIONS

International Search Report dated Jan. 21, 2021 for International Application No. PCT/US2020/054366, 7 pages.

*Primary Examiner* — Stanton L Krycinski
(74) *Attorney, Agent, or Firm* — Bochner IP, PLLC; Andrew D. Bochner

(57) ABSTRACT

Disclosed is a system for storing cookware in an efficient and compact format. The system is modular, and provides a storage solution that is capable of holding significant weight with efficiency. The cookware system comprises a plurality of storage units configured to store pots and pans. Each cookware storage unit may be configured for magnetic coupling with one or more additional cookware storage units. The storage unit may include a first wall, second wall, bridge and gap.

9 Claims, 6 Drawing Sheets

(56) References Cited

U.S. PATENT DOCUMENTS

| | | | | |
|---|---|---|---|---|
| 4,944,413 | A * | 7/1990 | Connell | A47B 65/00 211/11 |
| 5,056,677 | A * | 10/1991 | Toyosawa | A47J 47/16 220/4.21 |
| D323,766 | S * | 2/1992 | Robbins | D6/553 |
| 5,183,163 | A * | 2/1993 | Slaiken | A47B 65/20 211/43 |
| 5,332,106 | A * | 7/1994 | Schlotte | A47G 21/14 211/49.1 |
| D436,537 | S * | 1/2001 | Robbins | D7/590 |
| 6,352,162 | B1 * | 3/2002 | Yang | A47B 65/20 211/43 |
| 6,494,428 | B1 * | 12/2002 | Robbins | A47J 47/16 248/311.2 |
| D500,638 | S * | 1/2005 | Srivastava | D7/601 |
| 6,923,414 | B2 * | 8/2005 | Shida | F16M 11/22 248/346.07 |
| 7,448,506 | B2 * | 11/2008 | Berti | A47G 21/14 206/553 |
| 8,091,845 | B2 | 1/2012 | Di Lollo | |
| 10,098,454 | B2 * | 10/2018 | Hsieh | A47B 96/027 |
| 10,780,832 | B2 * | 9/2020 | Renner | B60P 3/14 |
| 2005/0279725 | A1 * | 12/2005 | Sheldon | A47J 47/16 211/175 |
| 2008/0060205 | A1 * | 3/2008 | Schmidt | A47G 21/14 30/298.4 |
| 2012/0211449 | A1 | 8/2012 | Newbauer | |
| 2014/0183148 | A1 * | 7/2014 | Ho | A47J 47/16 211/49.1 |
| 2016/0166117 | A1 * | 6/2016 | Oduguwa | A47G 21/14 206/553 |
| 2017/0055703 | A1 | 3/2017 | Corless | |

FOREIGN PATENT DOCUMENTS

| | | | |
|---|---|---|---|
| RU | 2017145067 A | 6/2019 | |
| WO | WO-2015072641 A1 * | 5/2015 | A47J 47/16 |

\* cited by examiner

COOKWARE STORAGE SYSTEM

BACKGROUND

Modern day kitchens often include numerous pots and pans ("cookware") for cooking. Due to varied cooking needs, many kitchens include numerous size pots and pans, resulting in a need to store such cookware.

Due to the constant use of cookware, varied layouts of kitchens in different homes, and need for accessible and convenient cookware, a multitude of cookware storage systems have been attempted.

Conventional cookware storage systems attempt to store cookware to reduce the footprint and space needed. This is particularly beneficial in scenarios where kitchens are small, such as apartments in urban settings. However, even with reduced footprints, conventional cookware storage systems are seldom efficient.

Additionally, durability and reliability, in addition to efficiency and ease-of-use, have proven to be a long-standing issue in cookware storage. Conventional wire storage racks suffer from warping, stretching and bending, and are unable to hold significant amounts of weight. Moreover, conventional wire storage racks often scratch the cookware, cause degradation and removal of any coating, while also damaging the aesthetic of the product. Additionally, wire storage systems still do not resolve the problem of storage efficiency, instead merely stacking cookware on the units as shelves. Such systems are not modular, and are only in one piece.

Conventional cookware storage systems employ stackable solutions, which create frustration and inefficiency, due to the need to maneuver and pull out a bottom cookware component when desired. For example, retrieving a simple pan for cooking often involves pulling out the full heavy stack of cookware, then pulling out the needed pan from within the stack, then placing the remaining stack back in the precise location within the cabinet.

Thus, it would be desirable to provide systems and devices for providing efficient storage for cookware. It would be further desirable to provide systems and devices for efficient storage in a reduced footprint.

It would be yet further desirable to provide systems and devices for storage of cookware that are modular, customizable, reliable and durable, in order to fit any kitchen cabinet size or structure, or to orient in any way a customer may see fit.

It would be yet further desirable to provide systems and devices for storage of cookware that also allow for proper air-drying of the cookware. Therefore, systems and devices incorporating such advantageous features are hereby provided.

SUMMARY

Disclosed is a system for storing cookware in an efficient and compact format. The system is modular, and provides a storage solution that is capable of holding significant weight with efficiency. The cookware system comprises a plurality of storage units configured to store pots and pans. Each cookware storage unit may be configured for magnetic coupling with one or more additional cookware storage units. The storage unit may include a first wall, second wall, bridge and gap.

DETAILED DESCRIPTION OF THE INVENTION

Disclosed herein are systems and devices for cookware storage (the "system"). In an embodiment, the system provides a space-saving benefit. Further disclosed is a novel system and device that avoids the need for stackable solutions, which are inefficient, time consuming, and lead to frustration.

In one embodiment, the system provides an integrated drying system for drying cookware, as well as dinnerware, cutlery, gadgets and cooking utensils (the "components"), while also providing integrated storage. The cookware, dinnerware, cutlery, gadgets and utensils are stored in slots that provide convenient storage, while also providing circulation of air around the stored components, including underneath the components. Thus, the components are placed in slots, elevated above the floor, to allow for air circulation underneath. This eliminates the need for dedicated drying racks, hand drying, or use of the dishwasher.

In one embodiment, the cookware system incorporates modular storage units, without the need for stacking. In certain embodiments, a plurality, such as, for example, four pan racks, are connected to one another. Each pan rack may be a slot, with each slot being optimized to store one cookware component (such as, for example, a pot). The racks are specially formulated such that they can be placed within kitchen cabinets or other storage spaces, or also sit out on counters or tables.

Figure 1A:
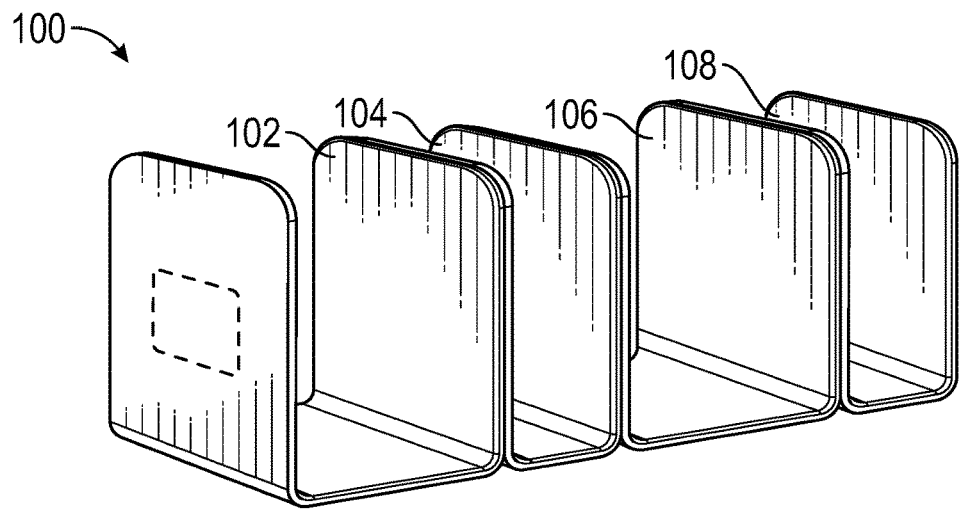
FIGS. 1A-1C illustrate front perspective views of the cookware storage system, in accordance with various embodiments.
Figure 1B:
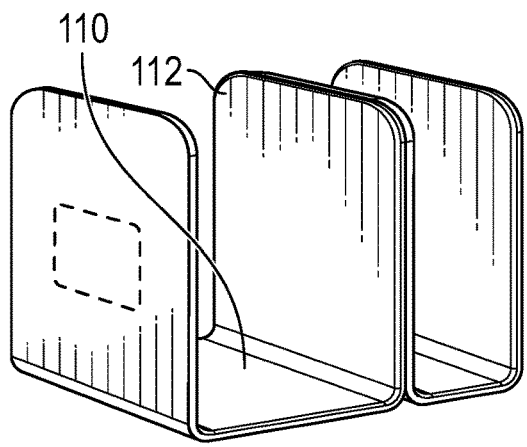
Figure 1C:
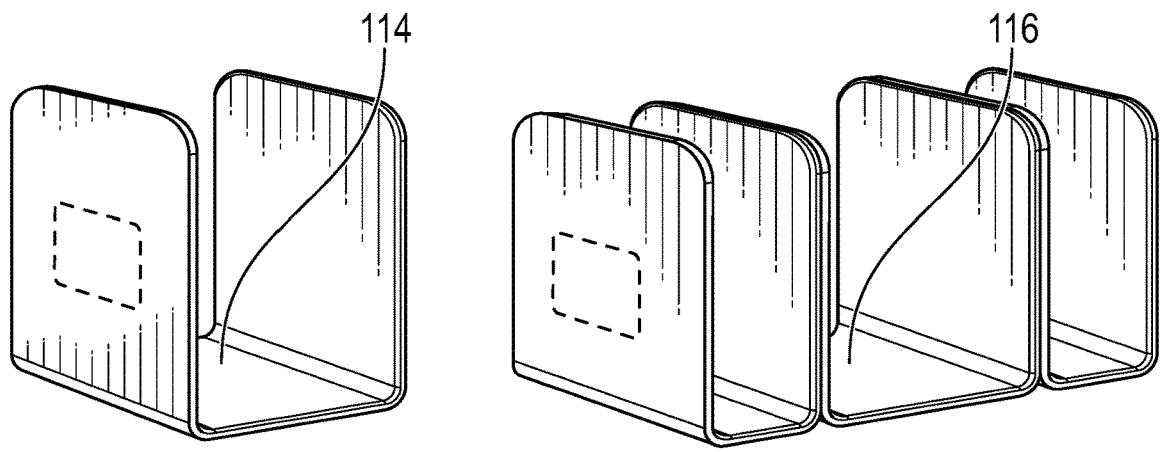

Referring now to FIGS. 1A-1C, illustrated are various embodiments of the cookware storage system. FIG. 1A illustrates the system 100 with four slots 102, 104, 106, 108, each slot being connected to another, and forming one modular unit. However, each slot may also include its own floor 110 and sidewalls 112, as shown in FIG. 1B.

It should be noted that, in accordance with various embodiments, the system, slots and modular units may be any suitable shape or size, and those illustrated in the drawings are for illustrative purposes only.

FIG. 1B illustrates a close-in view of the system illustrated in FIG. 1A. Further, the slots may be formed in multiple widths, as shown. Thus, each slot is modular, and allows for separation and based on unique needs. Therefore, in certain embodiments, each slot may be completely separable from one another, and completely modular.

FIG. 1C illustrates an exemplary view of the system, with a modular slot 114 removed from the remaining slots 116.

In an embodiment, and as illustrated, the system may be separated into discrete slots. The slots may then be attached to one another to form a cohesive rack system.

Figure 2A:
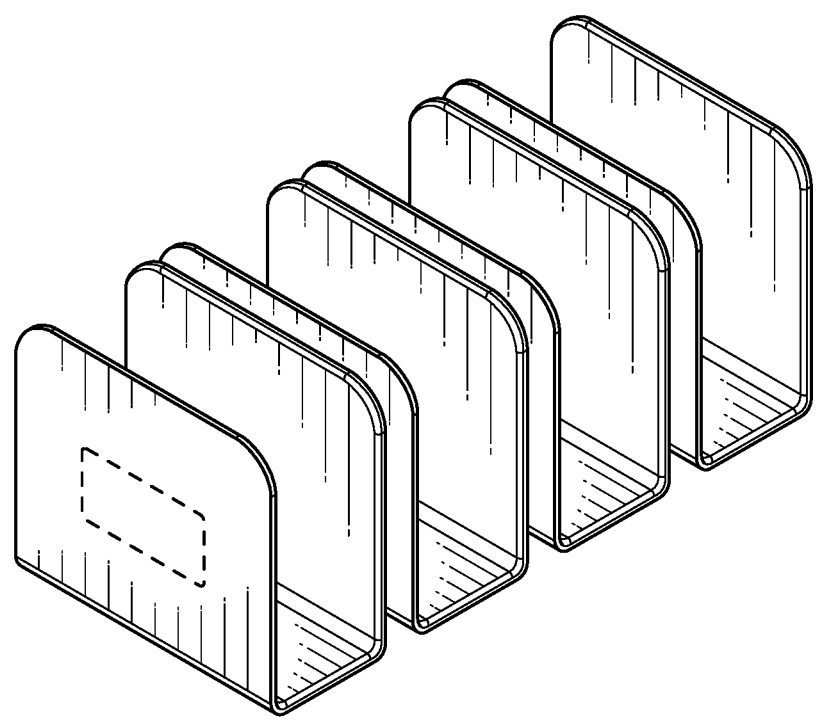
FIGS. 2A-2B illustrate a front elevated view of the cookware storage system in various embodiments.
Figure 2B:
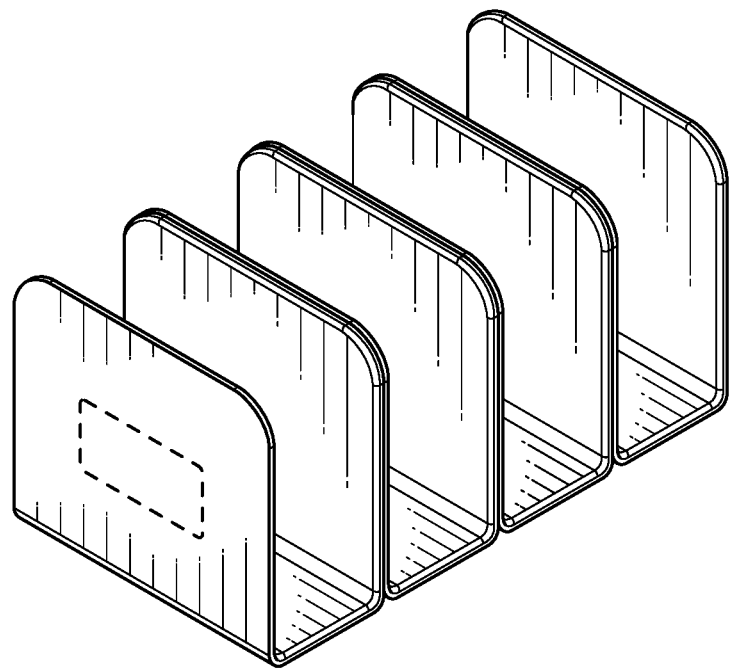

Referring now to FIGS. 2A and 2B, illustrated are views of the system in various configurations. In order to maintain consistent strength and durability, the system avoids the use of hook and loop fasteners (sold under the brand name VELCRO, for example), which would otherwise fall off or weaken over time. Further, the system avoids interconnected slots between the walls, which would not allow for use as standalone racks.

The system therefore utilizes a proprietary magnetic system to allow the racks to interconnect, while at the same time being easily removable from one another, and maintaining their modular nature. Thus, the cookware storage system, in accordance with an embodiment, includes a magnetic attachment mechanism 300 within each sidewall of the slot 302. This feature is illustrated in FIG. 3.

Figure 3A:
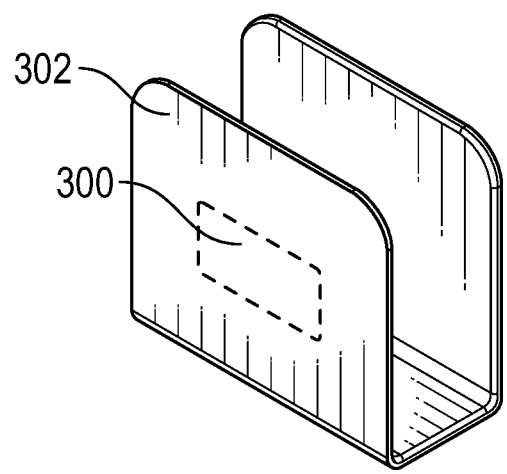
FIG. 3A illustrates a front elevated view of a portion of the cookware storage system in accordance with an embodiment.
Figure 3B:
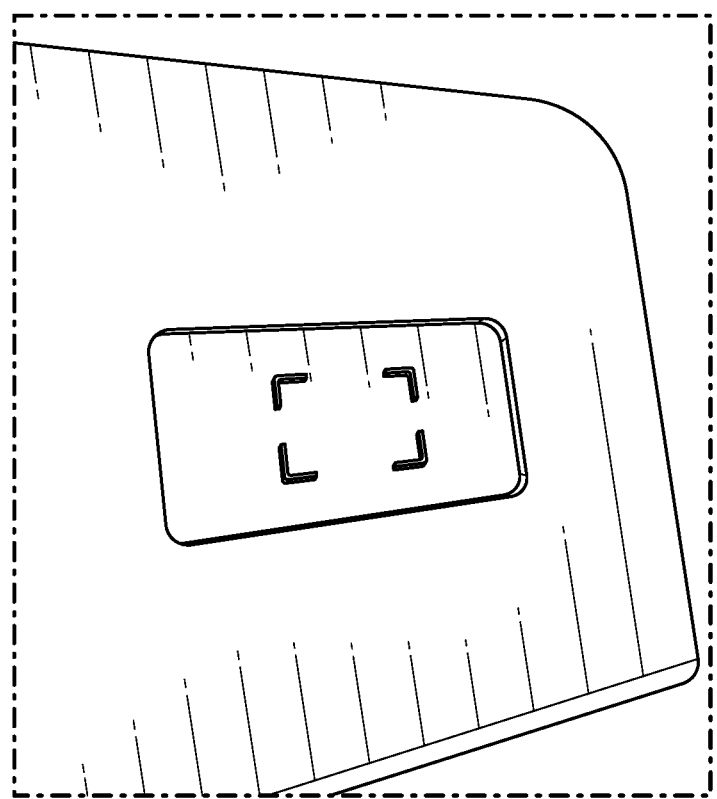
FIG. 3B illustrates an embodiment of the system.

Referring now to FIG. 3, illustrated within the broken lines is a magnetic attachment mechanism. The mechanism may be located on either sidewall of the individual rack. The magnetic attachment mechanism may include a door. The door may be flush with the sidewall. The door may be protruding from the sidewall, or may be further indented from the sidewall. The door may be formed of identical material to the sidewall, or of a different material, color, or texture. In another embodiment, the door may be formed of a specialized material, to allow the magnets residing underneath to maintain their strength. FIG. 3B illustrates a portion of the sidewall with a cover removed, showing a residing portion 301 for a magnet, in accordance with certain embodiments.

Figure 4:
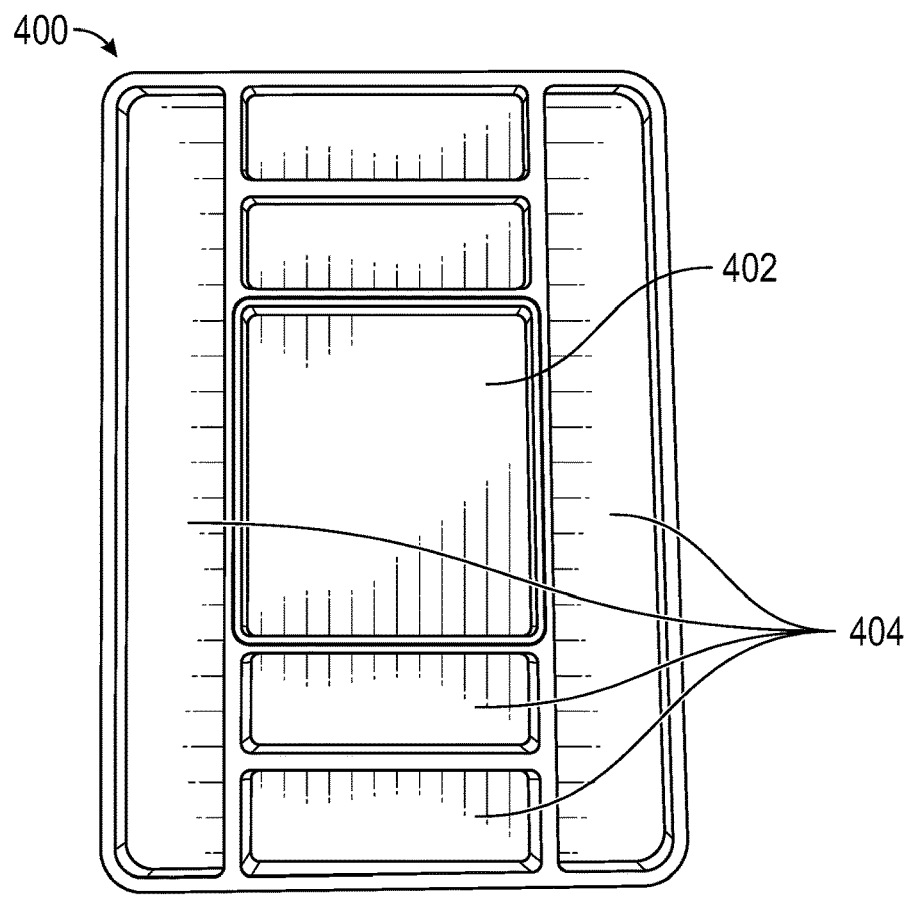
FIG. 4 illustrates an embodiment of an internal portion of the cookware storage system.

Thus, in one embodiment, Acrylonitrile Butadiene Styrene (ABS) plastic may be used for the door. An exemplary embodiment of the inner side 400 of the door is shown in FIG. 4. Beneath the ABS plastic, one or more magnets may be used to form a magnetic connection with the adjacent rack. In one embodiment, a single slot 402, or multiple slots 404, may be formed within the sidewall, underneath the door, corresponding to space for the required magnets. It should be noted, however, that additional quantities of magnets are contemplated by the invention.

Thus, an ABS door cover may be used to cover the magnets forming the magnetic connection. However, due to the plastic of the ABS reducing the magnetic strength of the magnets, in one embodiment, the ABS door may be specifically formed to maintain proper shape, but also to allow for maximum magnetic strength. In one embodiment, the door may have a thickness of 0.2 mm.

In certain embodiments, a 30×19×1.6 mm magnet may be used. In an embodiment, the magnet may have a strength of N54 or any suitable variation thereof. For example, the N54-type magnet may provide sufficient force to maintain interconnection between a plurality of sidewalls, while allowing for easy detachment, and not interfering with the ability of the cookware itself to reside therein. This particularly sized magnet may be placed within the sidewall, such as shown in FIG. 3. The magnet is optimally formed and sized to hold cookware racks in place relative and adjacent to one another, and allowing the racks to connect. It should be noted that the magnet may be of a similar size, such as between 25-35×15-23×1-2 mm.

In order to increase the drying capabilities of the rack, a space may be located within the rack, below the resting position of the cookware and above the floor/foundation. In one embodiment, this space may be two feet from top to bottom, or a variation thereof, such as approximately two feet.

Figure 5A:
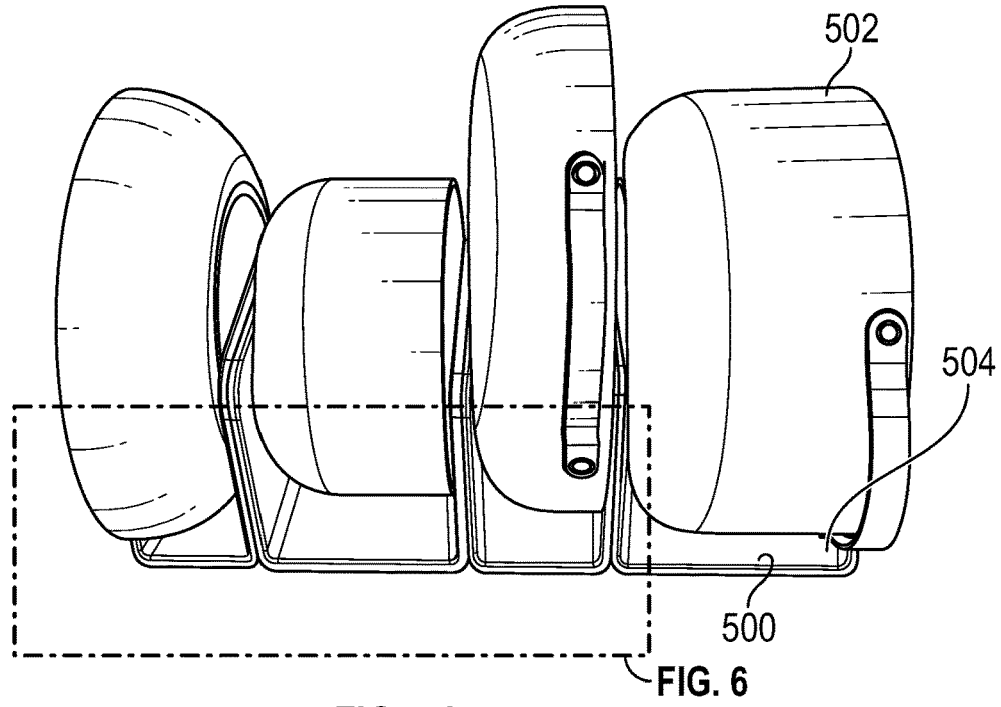
FIGS. 5A-5B illustrate various embodiments of utilizing the cookware storage system.
Figure 5B:
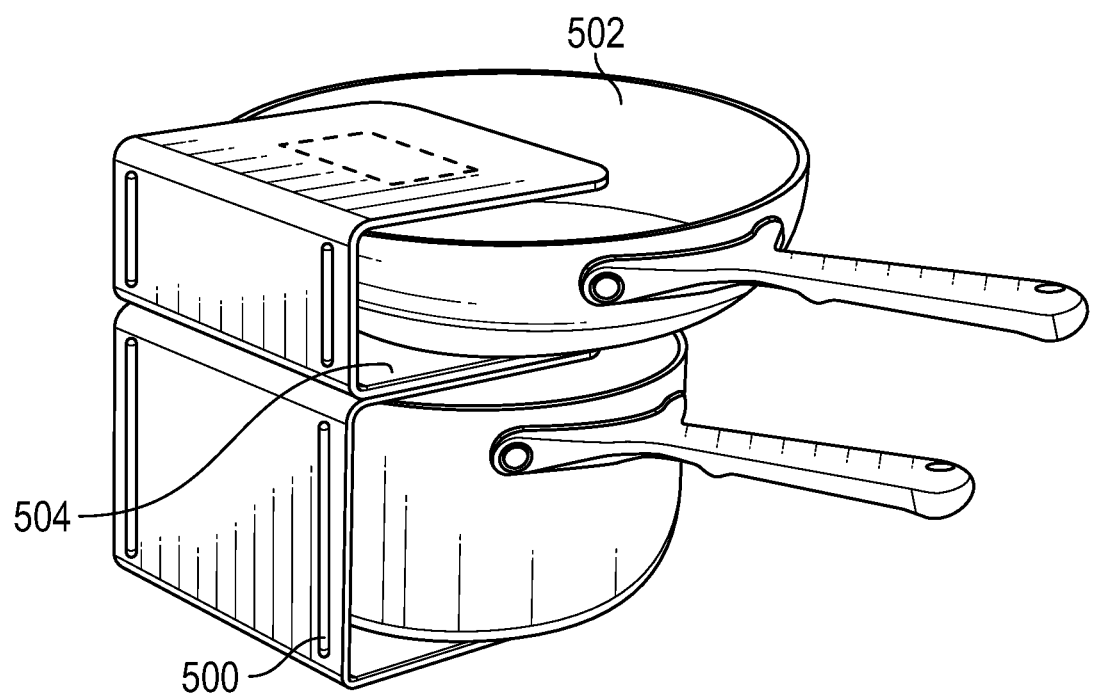
Figure 6:
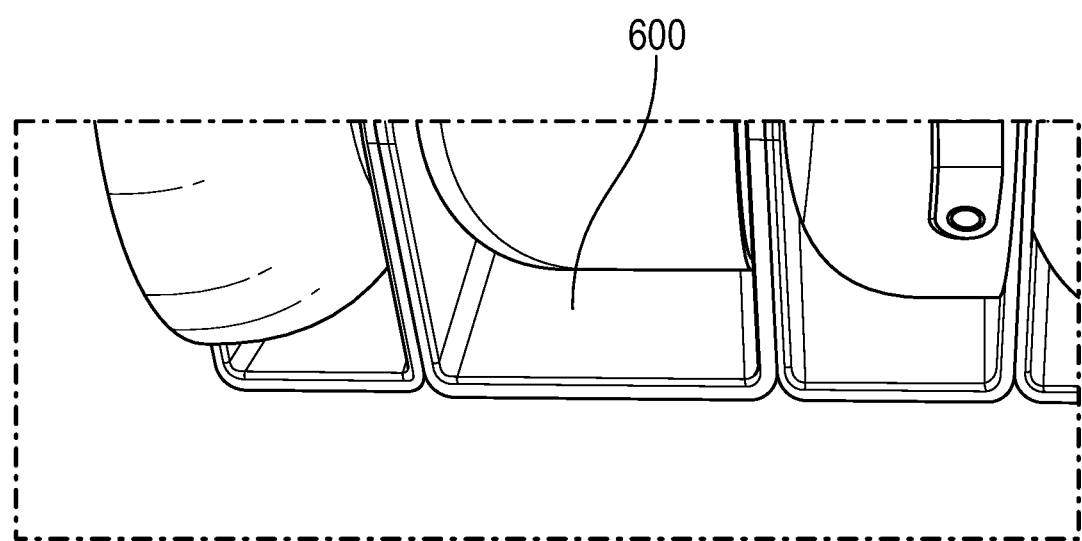
FIG. 6 illustrates a close-up view of the embodiment in FIG. 5A.

Referring now to FIGS. 5A-5B, illustrated are various cookware elements 502 within the modular racks 500. Further illustrated are the spaces below the stored cookware, and above the floor 504, which allow for circulation of air, thereby providing a drying system to the cookware. FIG. 6 illustrates the space 500 for drying in further details.

As previously discussed, the storage system may be formed of a plastic, such as ABS plastic, or any other suitable material, such as fiberglass, composites, metal, or wood. In one embodiment, the plastic is of any suitable width. In a further embodiment, the ABS plastic may be formed of a specific width that provides structural support to the cookware, without bending. Thus, 3 mm ABS plastic, which bent when the cookware was stacked, may not be used. In an embodiment, 5 mm ABS plastic may be used, due to its durability and strength. The ABS plastic may be ABS Texture G1001A, or a suitable replacement.

Figure 7:
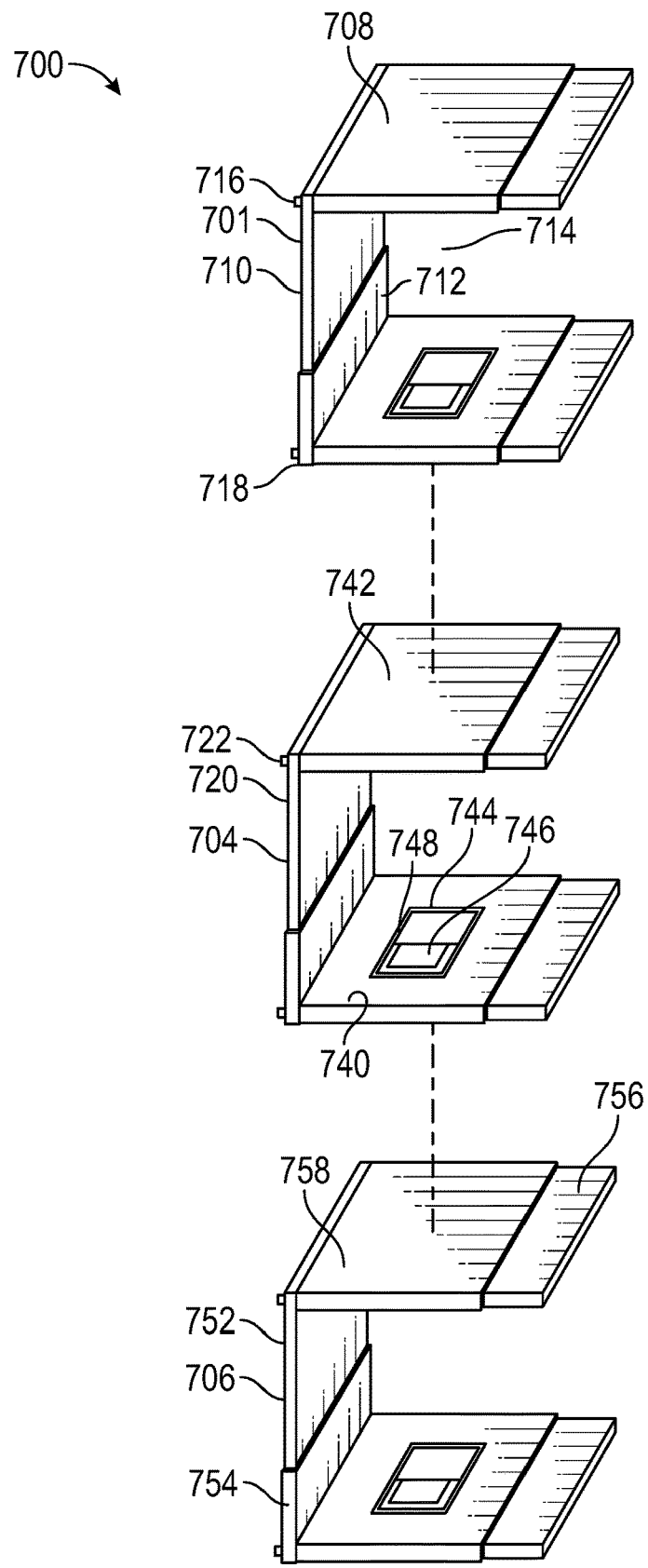
FIG. 7 illustrates a view of the cookware storage system, in accordance with an embodiment.

Referring now to FIG. 7, the cookware storage system 700 may include three or more cookware storage units 702, 704, 706. Each storage unit may include a first wall 708, a second wall 710, a bridge 712, and a gap 714. The bridge may form a first juncture 716 with the first wall and a second juncture 718 with the second wall. The junctures connect the first and second wall to the bridge, preferably providing an angle between them of approximately 90 degrees. The junctures are strong enough to support the structural integrity of the bridge and walls, and should be able to hold pots or pans leaning against the first and second walls and prevent the walls from bending more than ninety-five (95) degrees from the bridge.

The gap may be formed by the first and second walls and the bridge, and in some embodiments, is large enough to receive and store pots and pans of varying dimensions. Accordingly, the gap may be open on at least three sides so that the cookware storage units can be made larger or wider than the pots and pans that they hold. It is expected that the pots and pans may extend out through the empty sides of the gap such that their center aligns with the center of the first and second walls.

The bridge may predominantly comprise a main body 720, as well as an embossed portion 722 which extends from the main body. In certain embodiments, the embossed portion may elevate the main body by 5 mm or more, but should extend at least 2 mm. The embossed portion may feature a high-friction surface in order to prevent the storage units from sliding about on a kitchen counter or inside a kitchen cabinet. The embossed portion does not need to be particularly wide, and may comprise less than 10%, or even less than 5% of the surface area of the main body.

Each wall may include an inward face 740 and an outward face 742, with an inner compartment 744 embedded between the faces. The inner compartment may be sufficiently deep to accommodate one or magnets 746 of sufficient strength to couple the storage units. The storage units may also be designed so that the magnets couple based on their respective polarities. That is, just as the magnets have north and south poles, with the north attracting the south and vice versa, so too should the storage units have north and south poles corresponding to the magnets embedded in the inner compartments of the walls. The inner walls may have doors 748 to facilitate the removal and replacement of magnets that have lost their polarity.

Since pots and pans are frequently made of magnetic material, at least to facilitate their use on induction-based stove tops, it is helpful to block or limit the magnetic fields effect on the pots and pans placed in the storage units. Otherwise, there is the risk that by picking up a single magnetic pot, the entire stack of storage units might also be lifted. At the same time, it may be helpful for some level of magnetic coupling between the pots and the pans and the storage units in order to decrease the incidence of the pots and pans sliding out of the storage units, and to maintain the stability of the cookware storage ecosystem as a whole. These goals may be accomplished by the allocative application of ferromagnetic material on the inner faces of the walls.

Since pots and pans are of varying height, and many users may wish to designate a single storage unit for a single pot or pan, the bridge itself may be designed to be extended via the coupling of an inner and outer sleeve 752, 754. The outer dimensions of the inner sleeve may roughly correspond to the inner dimensions of the outer sleeve, so that the inner sleeve may be slidably disposed inside the outer sleeve. The walls may also be designed for extension to correspond to the varying diameters of the pots and pans with inner and outer sleeves 756, 758.

An exemplary embodiment of the cookware storage system may therefore include a plurality of cookware storage units configured to store pots and pans. Each cookware storage unit may be configured for magnetic coupling with at least one or more additional cookware storage units. Each cookware storage unit may include a first wall, a second wall, a bridge, and a gap. The bridge may form a first juncture with the first wall and a second juncture with the second wall. The bridge may be configured to rest against a hard surface and include a main body and an embossed portion.

The embossed portion may extend at least 2 mm from the main body. The embossed portion may comprise a certain percentage of a surface area of the main body, such as less than 10%. In certain embodiments, the embossed portion may comprise greater than 10% of a surface area of the main body. The embossed portion may provide at least 2 mm of distance between the main body and the hard surface.

The first juncture connecting the bridge to the first wall and the second juncture connecting the bridge to the second wall may do so at an angle between 85 and 95 degrees so that the bridge is substantially orthogonal to the first and second walls.

The gap may be a suitable shape, such as a rectangular cuboid in shape, having six sides, formed on three sides by the first wall, the second wall, and the bridge, and being open to the atmosphere on three remaining sides to facilitate air drying of pots and pans.

The first and the second wall may each include an inward face and an outward face and at least one inner compartment. The inward face may be oriented toward the gap, with the outward face being disposed opposite the inward face. The inner compartment may be disposed between the inward face and the outward face. The inner compartment may further house at least one magnet, the at least one magnet having a first pole, a second pole, and a magnetic field.

The inward face may be formed of a ferromagnetic material and configured to restrict the magnetic field of at least one magnet from entering the gap. The outward face may be formed of a non-ferromagnetic material and configured to permit the magnetic field to transcend the outward face.

The magnet in the inner compartment of the first wall may be oriented so that the first pole is directed toward the gap and the magnet in the inner compartment of the second wall oriented so that the second pole is directed toward the gap.

The bridge may include an inner sleeve and an outer sleeve, with the inner sleeve being disposed inside the outer sleeve. The inner sleeve and outer sleeve may extendedly engage such that the bridge can increase or decrease in length in order to accommodate pots or pans of varying height.

The first and second walls each comprising an inner sleeve and an outer sleeve, with the inner sleeve being disposed inside the outer sleeve. The inner sleeve and outer sleeve may be extendedly engaged such that the first and second walls can increase or decrease in length in order to accommodate pots or pans of varying width. Each of the first and second walls may be at least four inches in width and four inches in length and configured to accommodate pots or pans having a diameter of more than six inches.

Each of the plurality of cookware storage units may include a door that is slidably or hingedly attached to the first and second walls to provide access to at least one inner compartment. The bridge may be between one to nine inches in height.

Thus, in accordance with the systems and devices disclosed herein, advantageous storage and drying systems for cookware are hereby provided.

While this invention has been described in conjunction with the embodiments outlined above, many alternatives, modifications and variations will be apparent to those skilled in the art upon reading the foregoing disclosure. Accordingly, the embodiments of the invention, as set forth above, are intended to be illustrative, not limiting. Various changes may be made without departing from the spirit and scope of the invention.

What is claimed is:

1. A cookware storage system comprising a plurality of cookware storage units configured to store pots and pans, each cookware storage unit configured for magnetic coupling with two other cookware storage units, with each cookware storage unit comprising:
   a first wall, a second wall, a bridge, and a gap,
      the bridge forming a first juncture with the first wall and a second juncture with the second wall;
      the bridge configured to rest against a hard surface and having a main body and an embossed portion, the embossed portion extending at least 2 mm from the main body, comprising less than 10% of a surface area of the main body, and configured to provide at least 2 mm of distance between the main body and the hard surface;
      both the first juncture connecting the bridge to the first wall and the second juncture connecting the bridge to the second wall at an angle between 85 and 95 degrees so that the bridge is substantially orthogonal to the first and second walls;
      the gap being a rectangular cuboid in shape, having six sides, formed on three sides by the first wall, the second wall, and the bridge, and being open to the atmosphere on three remaining sides to facilitate air drying of pots and pans;
      the first and the second wall each comprising an inward face and an outward face and at least one inner compartment,
      the inward face oriented toward the gap, the outward face being disposed opposite the inward face, the at least one inner compartment disposed between the inward face and the outward face and housing at least one magnet, the at least one magnet having a first pole, a second pole, and a magnetic field;
      the inward face being made of a ferromagnetic material and configured to restrict the magnetic field of the at least one magnet from entering the gap;
      the outward face being made of a non-ferromagnetic material and configured to permit the magnetic field to transcend the outward face;

the at least one magnet in the at least one inner compartment of the first wall oriented so that the first pole is directed toward the gap and the at least one magnet in the at least one inner compartment of the second wall oriented so that the second pole is directed toward the gap.

2. The cookware storage system of claim 1, the bridge comprising an inner sleeve and an outer sleeve, the inner sleeve being disposed inside the outer sleeve, the inner sleeve and outer sleeve being extendedly engaged so that the bridge can increase or decrease in length in order to accommodate pots or pans of varying height.

3. The cookware storage system of claim 1, the first and second walls each comprising an inner sleeve and an outer sleeve, the inner sleeve being disposed inside the outer sleeve, the inner sleeve and outer sleeve being extendedly engaged so that the first and second walls can increase or decrease in length in order to accommodate pots or pans of varying width.

4. The cookware storage system of claim 1, each of the plurality of cookware storage units comprising a door, the door being slidably or hingedly attached to the first wall to provide access to the at least one inner compartment.

5. The cookware storage system of claim 1, the first and second walls each being at least four inches in width and four inches in length and configured to accommodate pots or pans having a diameter of more than six inches.

6. The cookware storage system of claim 1, the bridge being between one and three inches in height and configured to accommodate pans.

7. The cookware storage system of claim 1, the bridge being between three and six inches in height and configured to accommodate pots.

8. The cookware storage system of claim 1, the bridge being between six and nine inches in height and configured to accommodate pots.

9. The cookware storage system of claim 1, each of the plurality of cookware storage units comprising a door, the door being slidably or hingedly attached to the second wall to provide access to the at least one inner compartment.

* * * * *